United States Patent [19]

Fortnagel et al.

[11] Patent Number: 4,956,973
[45] Date of Patent: Sep. 18, 1990

[54] EXHAUST GAS RECYCLING SYSTEM FOR AN EXHAUST GAS TURBOCHARGED ENGINE

[75] Inventors: Manfred Fortnagel, Korb; Dieter Platzer, Bissingen, both of Fed. Rep. of Germany

[73] Assignee: Daimler-Benz AG, Fed. Rep. of Germany

[21] Appl. No.: 834,516

[22] Filed: Feb. 28, 1986

Related U.S. Application Data

[63] Continuation of Ser. No. 731,599, May 6, 1985, abandoned, which is a continuation of Ser. No. 491,181, May 3, 1983, abandoned.

[30] Foreign Application Priority Data

May 14, 1982 [DE]  Fed. Rep. of Germany ....... 3218156

[51] Int. Cl.$^5$ .................... F02B 37/12; F02B 47/08
[52] U.S. Cl. .................... 60/605.2; 60/611
[58] Field of Search ............. 60/601, 602, 611, 605

[56] References Cited

FOREIGN PATENT DOCUMENTS 84841  6/1980  Japan ......................... 60/605

*Primary Examiner*—Michael Koczo
*Attorney, Agent, or Firm*—Evenson, Wands, Edwards, Lenahan & McKeown

[57] ABSTRACT

The invention relates to a super-charged fuel-injected internal combustion engine with an exhaust gas driven turbocharger and exhaust gas recycling. To increase the volume of recycled exhaust gases by means of an increase in the pressure drop between the pressure in the exhaust gas line upstream of the turbine and the pressure in the engine charging air line downstream of the compressor, a pressure control valve is provided in either the exhaust line downstream of the turbine or at the compressed air line of a bypass line bridging the compressor.

4 Claims, 1 Drawing Sheet

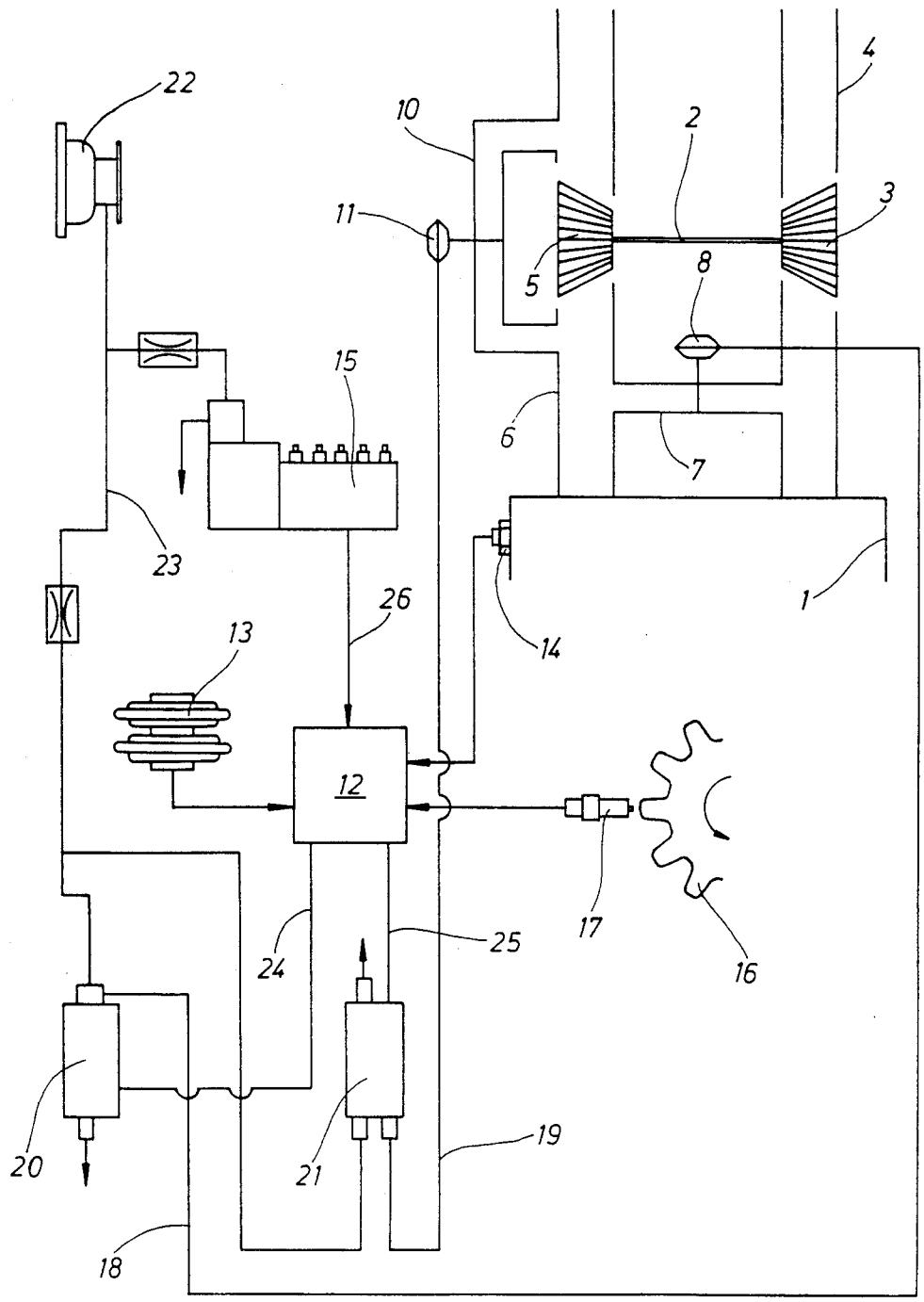

EXHAUST GAS RECYCLING SYSTEM FOR AN EXHAUST GAS TURBOCHARGED ENGINE

This application is a continuation, of application Ser. No. 731,599, filed May 6, 1985, abandoned which is a continuation of application Ser. No. 491,181, filed May 3, 1983, abandoned.

BACKGROUND AND SUMMARY OF THE INVENTION

The invention relates to an exhaust gas recycling system for an exhaust gas turbocharged internal combustion engine for propelling a motor vehicle. The invention is especially concerned with an engine having an exhaust gas turbine driven air compressor, the exhaust gas line up-stream of the turbine being connected by an exhaust gas recycling line with an engine charging air line downstream of the compressor. An exhaust gas recycling valve is arranged in the exhaust gas recycling line for accommodating mixing of exhaust gas with the charging air when a control valve adjusts a lower pressure in the charging air line than in the exhaust gas line.

An exhaust gas recycling system of the above-mentioned kind is known from U.S. Pat. No. 3,925,989. In this arrangement a control valve is disposed in the exhaust gas line which is operated in dependance on the engine operating conditions to block out more or less of the flow of exhaust gas to the turbine and thereby adjust a higher pressure in the exhaust gas line than in the charging line. As a result of the higher pressure in the exhaust gas line, the exhaust gas can be mixed with the charging air by passing through an exhaust gas recycling line and a spring loaded one-way valve arranged therein. With this arrangement, the spring loaded one-way valve is so adjusted that a mixture of the exhaust gas with the charging air first occurs above a predetermined pressure difference between the exhaust and charging lines.

The known exhaust gas recycling system has the disadvantage that the volume of exhaust gas to be mixed with the charging air is only controlled as a function of the pressure ratio between the exhaust and charging air lines in such a manner that a varying recycling of the exhaust gas is not possible. Furthermore, the desired mixing of exhaust gas is obtained through structural measures at the exhaust gas side of the engine where valuable and expensive component parts must be installed. Finally, there is the disadvantage that the rotational speed of the turbocharger is reduced during operation with exhaust gas recycling so that with an acceleration from a part-load condition of the engine, the charging pressure build-up is delayed.

The invention is based upon the problem to improve the known exhaust gas recycling systems so that an optimally precise controlled exhaust gas volume can be mixed with the charging air for all respective desired operating ranges of the engine. Thereby, one can achieve the highest possible reduction in the NOx-(Nitrous oxide) emissions, no or only a very small increase in the CO-(Carbon monoxide), HC-(Hydrocarbon) and particle emissions, and no or only an insignificant increase in the fuel consumption.

The problem is inventively solved by providing a valve in a compressor bridging bypass line connected to the charging air line, which valve is controlled, by itself or together with an exhaust recycling valve, as a function of the operating conditions of the internal combustion engine of the motor vehicle.

The exhaust gas recycling system according to the invention has the advantage that not only the pressure ratio between the charging air line and the exhaust gas line, but also the exhaust gas recirculation volume, can be made to optimally correspond to the respective operating condition of the internal combustion engine and thereby result in a maximum possible reduction in NOx emissions with only minimal changes in the efficiency and in the remaining emissions. These results can be achieved with corresponding adjustment of the valve control characteristics to match the engine operating conditions.

A further advantage consists in that because of the control at the compressor side of the engine, the pressure drop at the turbocharger and its rotational speed is only decreased by the smallest possible amount, whereby during acceleration out of the part-load region, the charging pressure build-up can be accomplished in the smallest time. Finally, there is the advantage that the compressor side pressure control can be obtained in a simple manner with economical components.

An especially simple embodiment of the invention is obtained if the bypass line is integrated into the compressor housing of the exhaust gas turbocharger and the control valve is likewise mounted at the compressor housing.

Further objects, features, and advantages of the present invention will become more obvious from the following description when taken in connection with the accompanying drawings which show, for purposes of illustration only, one embodiment in accordance with the present invention.

BRIEF DESCRIPTION OF THE DRAWINGS

The single drawing figure schematically illustrates an exemplary embodiment of the invention.

DETAILED DESCRIPTION OF THE DRAWINGS

A compressed air charged fuel-injection type internal combustion engine 1 is equipped with an exhaust gas turbocharger 2. The turbine 3 of the turbocharger 2 is arranged in exhaust gas line 4 and the compressor 5 is arranged in engine air charging line 6. Upstream of the turbine 3, the exhaust gas line 4 is connected by means of an exhaust recycling line 7 with the charging line 6 at a position downstream of the compressor 5. An exhaust gas recycling valve 8 is arranged in the exhaust gas recycling line 7. Recycling valve 8 is controlled as a function of the operating characteristics of the internal combustion engine, for example: by the engine load characteristics, the engine rotational speed characteristics, the vehicle speed characteristics, the engine cooling water temperature characteristics, and so forth.

In the event the fuel-injected internal combustion engine 1 is provided as a propelling engine for a passenger vehicle, there can be provided a customary charging pressure regulator at a not illustrated bypass at the turbine side of the turbocharger.

The amount of exhaust gases which is recycled through the exhaust gas recycling line 7 is dependant upon the pressure difference between the pressure $P_1$ in the exhaust gas line 4 upstream of the turbine 3 and the pressure $P_2$ in the charging line 6 downstream of the compressor 5 and upon the free cross-section of the exhaust gas recycling line 7.

Since an increase in this cross-section of line 7 beyond a certain point does not bring about an increase in the volume of exhaust gas recycled, the charged air line 6 is provided with a bypass line 10 which bridges the compressor 5 and includes a vacuum pressure controlled valve 11, which valve 11 is controllably closed or opened corresponding to a characteristic curve.

During engine idling and part-load operation, the two valves 8 and 11 are held in respective opened positions by means of control lever (or primary path) or the like, which opened positions correspond to the indicated injection volume and operating condition of the injection pump 15. A portion of the air required by the compressor 5 is recirculated from the pressure side of compressor 5 through the bypass line 10 to the suction side. The charging air pressure $P_2$ at the pressure side of compressor 5 is lowered by means of the short-circuit flow of recirculating air through line 10 around the compressor 5 so that $P_2 < P_1$ and exhaust gas from recycling line 7 can be mixed together with the engine charging air. The fine or precise control of the volume of exhaust gas which is mixed with the charging air is obtained by means of the exhaust gas recycling valve 8. With a full load, the valves 8 and 11 are closed so that no exhaust gas can be mixed with the charging air.

In preferred exemplary embodiments the apparatus for controlling the valves 8 and 11 includes an electrical control device 12 which accepts electrical activating variable signals corresponding to the engine operating characteristics over all operating ranges in which an exhaust gas recycling is desired. As supplementary actuating variables, a signal corresponding to the outside air pressure is supplied to control device 12 by means of the barometer 13, and a signal corresponding to the detected temperature of the combustion engine 1 is supplied to control device 12 by means of a temperature detector 14. The information concerning the loading condition of the engine is coupled to the control device 12 via schematically depicted line 26 by means of the control device for the injection pump 15. The control device 12 is activated by means of the rotational movement of the engine, for example, by means of the sensor 17 sensing the rotational speed of fly wheel 16.

The valve 8 is connected by means of a line 18 to a pressure transfer valve 20 and the valve 11 is connected by means of line 19 to a pressure transfer valve 21. Both pressure transfer valves 20 and 21 are supplied with vacuum pressure by means of a vacuum pump 22, a main line 23, and sub-main lines 23' and 23''. Electrical control signals from the control device 12 are supplied by the control lines 24 and 25 to the respective pressure transfer valves 20 and 21 where these electrical signals are converted into analogous vacuum pressure values, which are then transferred to control the valves 8 and 11 through the respective lines 18 and 19. The manner of control signal given to both or only one of the pressure transfer valves 20 and 21 is dependent on the loading condition of the internal combustion engine. The loading condition is indicated by the position of the control lever or the like of the injection pump 15 and is supplied to the control device 12 as an analogous electrical signal via line 26.

While we have shown and described a single preferred embodiment in accordance with the present invention, it is understood that the same is not limited thereto but is susceptible to numerous changes and modifications as would be known to those skilled in the art of the present disclosure and we, therefore, do not wish to be limited to the details shown and described therein but intend to cover all such changes and modifications as are encompassed by the scope of the appended claims.

We claim:

1. Exhaust gas recycling apparatus for an internal combustion engine having a combustion air intake line and an exhaust gas line and having a turbocharger which includes a turbine in the exhaust gas line and a compressor in the combustion air intake line, comprising:
   an exhaust gas recycling line connecting the exhaust gas line upstream of the turbine to the combustion air intake line downstream of the compressor;
   an exhaust gas recycling valve located in said exhaust gas recycling line for controlling a flow of exhaust gas from said exhaust gas line to said combustion air intake line;
   a bypass line connected to the combustion air intake line at a first connecting point which is located upstream of the exhaust gas recycling line and downstream of the compressor, and at a second connecting point which is located upstream of the compressor;
   a bypass control valve located in said bypass line for controlling air line pressure downstream of the compressor;
   vacuum means for controlling opening and closing of said exhaust gas recycling valve and said bypass control valve such that said valves are closed during full load operation and open during partial load operation of the engine; and
   electrical control means for controlling said vacuum means in response to variations in operating characteristics of the engine.

2. Exhaust gas recycling apparatus according to claim 1, wherein said vacuum means includes a vacuum source, vacuum lines connecting said vacuum source to the exhaust gas recycling and bypass valves, and first and second vacuum transforming valves located in said vacuum lines for controlling vacuum levels supplied to said exhaust gas recycling and bypass valves in response to electrical signals received from said electrical control means.

3. Exhaust gas recycling apparatus according to claim 2, wherein said electrical control means includes a control unit having a first input connected to sensor means responsive to the engine operating load level, a second input connected to sensor means responsive to engine speed, and a third input connected to sensor means responsive to engine coolant temperature, and having outputs connected to said first and second vacuum transformer valves, said control unit comprising means for varying signals levels at said outputs in correspondence with variations in signal levels at said first, second and third inputs.

4. Exhaust gas recycling apparatus according to claim 3, wherein said control unit has a fourth input connected to sensor means responsive to barometric pressure variations and, wherein said control unit further comprises means for varying signal levels at said outputs in correspondence with variations in signal levels at said first, second, third and fourth inputs.

* * * * *